Nov. 3, 1964    K. L. RACELY    3,155,193
FLIP-UP JACK FOR A VEHICLE LIFT
Filed Sept. 10, 1962
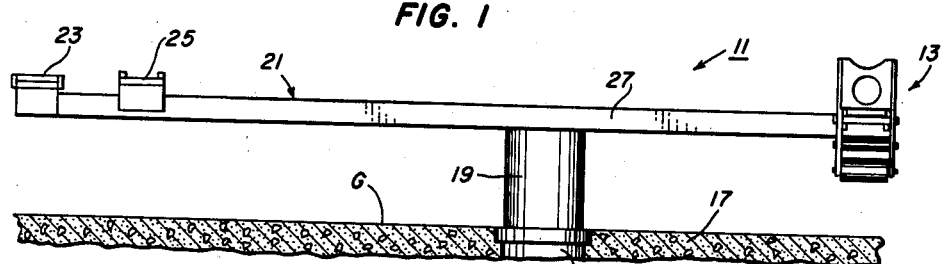
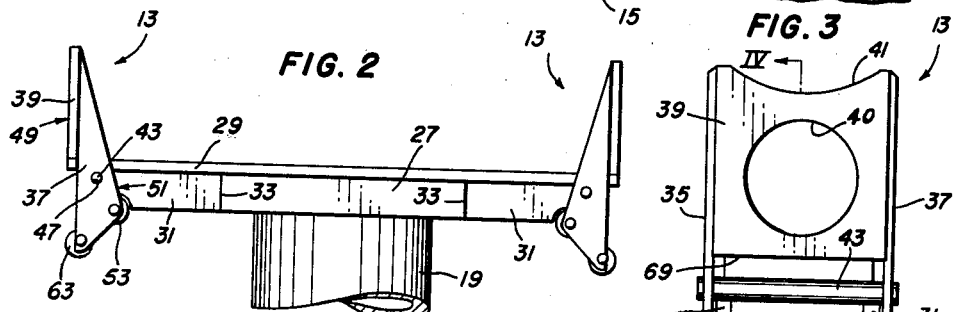
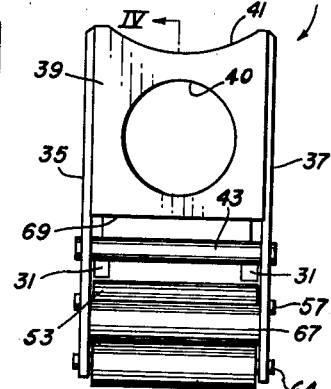
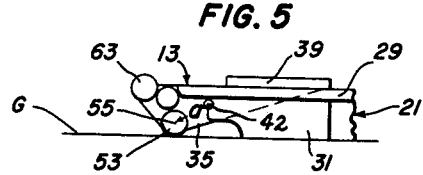
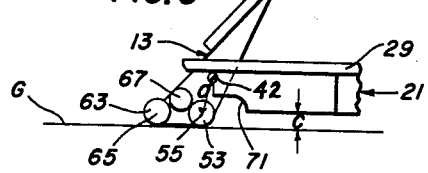
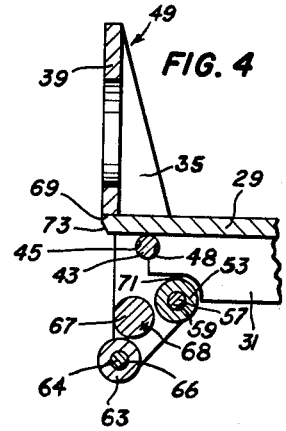
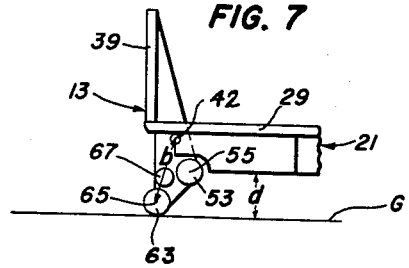
INVENTOR.
KERMIT L. RACELY
BY John R. Walker, III
Attorney 3,155,193
FLIP-UP JACK FOR A VEHICLE LIFT
Kermit L. Racely, Memphis, Tenn., assignor to
Dover Corporation, Washington, D.C.
Filed Sept. 10, 1962, Ser. No. 222,334
7 Claims. (Cl. 187—8.74)

This invention relates to a jack for vehicle lifts, which jack flips up into an upright position when the vehicle lift superstructure is raised. More particularly, the present invention relates to such a jack that is normally in a downward position when the superstructure is in a lowered position adjacent the ground so that the vehicle can move into position over the superstructure, and then when the superstructure is raised and before the jack comes in contact with the underportions of the vehicle, the jack flips up into an upright position for engaging the vehicle.

One of the problems that has existed with the above mentioned type of jack has been caused by the introduction into this country of small foreign cars in which there is a crowded condition of the wires, conduits, etc. beneath the car so that there is limited space for picking up the car. Also, there is a limited space between the ground and the underportions of the car since the wheels are of small diameter. In fact, this problem with small cars exists to such an extent with some of the cars that the jacks do not have room to flip up to a complete upright position before the superstructure contacts the underportions of the car. It will be understood that this is a dangerous condition since, without the jacks being in an upright position, the car is prevented from being held securely, if at all, on the vehicle lift, and also there is the danger of the jacks damaging portions of the car by which it was never intended to be lifted.

The present invention is directed towards overcoming the above mentioned and other difficulties in jacks of this type by providing a unique and improved flip-up jack in which the jack makes an initial fast movement towards the upright position during a short first part of the movement of the superstructure from the ground.

Thus, one of the objects of the present invention is to provide a flip-up jack for a vehicle lift in which the jack quickly moves to an upright position before any part of the superstructure or jack comes in contact with the underportions of the vehicle to be raised.

A further object is to provide such a jack that renders the vehicle lift more versatile in that more different types of vehicles with low underclearances can be lifted.

A further object is to provide such a jack which is gravity-actuated and which by means of a unique arrangement of the rollers thereon is highly effective in its operation.

A further object is to provide such a jack which is simple in construction and economical to manufacture.

A further object is to provide such a jack which is positive in its operation, and there is little likelihood of its becoming broken, as opposed to other types of similar devices that have springs and the like and are more complicated in construction.

A further object is to provide such a jack which eliminates the criticalness heretofore existing in the alignment of a vehicle on the superstructure so that now the raising of the vehicle can be accomplished quickly.

A further object is generally to improve the design and construction of flip-up jacks for vehicle lifts.

The means by which the foregoing and other objects of the present invention are accomplished and the manner of their accomplishment will be readily understood from the following specification upon reference to the accompanying drawings, in which:

FIG. 1 is a side elevational view of a vehicle lift employing the flip-up jacks of the present invention.

FIG. 2 is an enlarged fragmentary end elevational view of the apparatus of FIG. 1.

FIG. 3 is a further enlarged side elevational view of the jack of the present invention.

FIG. 4 is a fragmentary sectional view taken as on the line IV—IV of FIG. 3.

FIGS. 5–7 are diagrammatic views showing the operation of the jack of the present invention.

Referring now to the drawings in which the various parts are indicated by numerals, a typical vehicle lift 11, with which the jacks 13 of the present invention are adapted to be used, is best shown in FIGS. 1 and 2 wherein it will be seen vehicle lift 11 comprises the usual cylinder 15 firmly embedded in a foundation 17, as concrete or the like, and having a vertically movable piston 19 carrying a superstructure 21. The fluid system for raising and lowering piston 19 is not shown since it forms no part of the present invention and comprises any suitable well-known means which utilizes a suitable fluid such as the combination of hydraulic and air pressure, or hydraulic fluid alone. Superstructure 21 preferably includes pairs of contact pads 23, 25 of usual construction and adapted to support the front end of the vehicle, not shown, in the usual manner, upon one of said pairs 23, 25 dependent upon the length of the vehicle being lifted. Superstructure 21 additionally includes a longitudinally extending elongated member 27 that is attached to the upper end of piston 19 by suitable means and to which member 27 are attached contact pads 23, 25. At the opposite end of elongated member 27 from contact pads 23, 25, a transversely extending member 29 is attached to the elongated member on the upper surface thereof as by welding or the like. Transversely extending member 29 forms part of superstructure 21 and extends in opposite directions beyond the side edges of elongated member 27, as best seen in FIG. 2. Under each of the overhanging portions of transverse member 29 which extend beyond elongated member 27 is provided a pair of vertically disposed support members 31 which extend in parallel spaced relationship transversely of superstructure 21. Support members 31 are fixedly attached along the upper edges thereof to the lower surface of transverse member 29, as by welding or the like, and are fixedly attached along the inner ends 33 thereof to the side edges of elongated member 27, as by welding or the like. At the outer ends of transverse member 29 are provided jacks 13 of the present invention, which are substantially identical except that they pivot in opposite directions, and the following description of the jack 13, to the left as viewed in FIG. 2, will suffice for both:

Jack 13 includes a pair of spaced end plates 35, 37, which are each substantially triangular in shape and which are rigidly interconnected adjacent one of their edges by means of a member 39 fixedly attached to plates 35, 37 as by welding or the like. For reduction of weight, an aperture 40 is preferably provided in member 39. Plates 35, 37 are perpendicular to member 39 and extend inwardly in parallel relationship from the opposite side edges of the member. The end of member 39 is provided with an arcuate depressed portion 41 whereby a place is provided to engage the vehicle, not shown, such as the axle thereof or other suitable portion on the undercarriage of the vehicle.

Jack 13 straddles the end of transverse member 29 with end plates 35, 37 being disposed on the outside of supports 31, and with member 39 being above the transverse member. In addition, jack 13 is pivotally mounted on superstructure 21 adjacent the end of transverse member 29 for pivot about a horizontal pivot axis 42, as by means of a pivot means or pin 43 which is fixedly attached to transverse member 29 by welding or the like, and the opposite ends of which pin extend through apertures 45, 47 respectively provided in end plates 35, 37 intermediate the ends thereof. Also, pin 43 is preferably received in arcuate cut-outs 48 provided in supports 31 where the pin is secured to supports 31 as by welding or the like.

Upon actuation of vehicle lift 11 to raise superstructure 21 from a lowered position, as shown in FIG. 5, the jack 13 is pivotable, as will be understood better from the description of the operation to follow later in the specification, from a downward position (as best seen in FIG. 5), through an intermediate position (as best seen in FIG. 6), to an upright position (as best seen in FIGS. 1–4 and 7).

For purposes of clarity, it will be understood that the portion of jack 13 above pin 43, when the jack is in said upright position, is in effect an arm that is adapted to engage a vehicle and is denoted vehicle engaging arm 49, and the portion of end plates 35, 37 below pin 43 is an extension of arm 49 and is denoted extension 51.

A first roller 53 is rotatably mounted on extension 51 for rotation about a first horizontal axis 55 as by means of an axle 57 extending through a central bore 59 in roller 53 so that the roller is rotatable about the axle, and which axle 57 has the ends thereof extending through aligned apertures in end plates 35, 37 to which the axle is secured by welding or the like. In a similar manner, a second roller 63, spaced from first roller 53, is rotatably mounted by an axle 64 on extension 51 for rotation about a second horizontal axis 65 which is parallel to first horizontal axis 55. Axle 64 extends through a bore 66 in roller 63 so that the roller is rotatable about the axle, and the ends of axle 64 are secured to end plates 35, 37 in a manner similar to the securing of axle 57 to the end plates. In addition, a cylindrical counterweight 67 is preferably disposed in parallel spaced relationship to rollers 53, 63 and is attached adjacent the ends of the counterweight to end plates 35, 37 as by welding or the like. The purpose of counterweight 67 is to add additional weight to extension 51 to insure positive action of jack 13. At any rate, the center of gravity of jack 13 is below the pivot means furnished by pin 43 and preferably substantially at the X mark shown as at 68 in FIG. 4, so that the jack will, when unrestrained, move towards said upright position and be stopped in said upright position by engagement of the inner edge 69 of member 39 with transverse member 29. It will be noted that when jack 13 is in said upright position, the arm 49 is extending substantially perpendicularly upward from transverse member 29. Also, it will be noted that when jack 13 is in said upright position, the rollers 53, 63 are offset to opposite sides of pivot axis 42, that is, roller 53 is to the right of pivot axis 42 and roller 63 is to the left of the pivot axis, as best seen in FIGS. 2, 4 and 7, and when jack 13 is in said intermediate position, shown in FIG. 6, and said downward position, shown in FIG. 5, and positions therebetween, the rollers 53, 63 are offset on the same side of pivot axis 42, that is, to the left as viewed in these figures. Additionally, it will be noted that the distance shown as at "a" between first horizontal axis 55 and pivot axis 42 is less than the distance shown as at "b" between second horizontal axis 65 and pivot axis 42. Thus, as will be better understood from the description of the operation of jack 13 to follow, the moment arm provided by first roller 53 relative to pivot axis 42 is shorter than the moment arm provided by second roller 63 relative to pivot axis 42 during the operation of the jack.

The lower corners of vertical supports 31 are cut out as at 71 to give room for roller 53 to move without touching the supports 31 when the jack 13 is moved into said upright position. Also, the lower outer edge of transverse member 29 is cut off as at 73 to make room for counterweight 67 when jack 13 is moved into said downward position, as shown in FIG. 5. It should be noted that when in said downward position, jack 13 is positioned in such a manner that member 39 is substantially horizontal and closely adjacent the upper surface of transverse member 29.

Assuming that, to begin with, superstructure 21 is in a lowered position, as seen in FIG. 5, wherein the superstructure is lowered adjacent the ground shown as at G, the operation of jack 13 during the raising of superstructure 21 will be as hereinafter described. It should be pointed out that when the term "ground" is referred to in the specification and claims, it means the upper surface of the foundation over which superstructure 21 operates, whether it be dirt, concrete or the like. With the superstructure 21 in said lowered position, it will be noted that the first roller 53 is in contact with the ground G and is holding jack 13 in said downward position against the tendency of the jack to rotate counterclockwise, as viewed in FIG. 5. When the superstructure is raised away from the ground G, it will be understood that first roller 53 will roll along the ground and jack 13 will pivot about the pivot axis 42 in a counterclockwise direction, with the moment arm established by first roller 53 movably restricting the jack and permitting it to move to the intermediate position shown in FIG. 6. It will be seen from this FIGURE that superstructure 21 has moved a short distance, by the amount shown as at "c," to a first given position above the ground G, and yet it will be observed that the jack 13 has moved substantially halfway to the upright position. Also, it will be noted that when jack 13 is in said intermediate position, both of the rollers 53, 63 are in engagement with the ground G. Further movement of superstructure 21 from said first given position upwardly will cause the moment arm to shift from that established by first roller 53 to that established by second roller 63, so that the second roller 63 movably restrains jack 13 and permits it to move from said intermediate position to said upright position, shown in FIG. 7. It will be seen from this FIGURE that the superstructure 21 has now moved by an amount shown as at "d" to a second given position above ground G. Also, it will be noted that the distance "d" is more than twice the distance "c." In other words, superstructure 21 has traveled a greater distance during the second part of its movement, that is, from said first given position to said second given position, than during the first part of its movement, that is, from said lowered position to said first given position, while the jack 13 has been pivoted substantially the same amount during these two parts of the movement of superstructure 21. Stated another way, with a given rate of rise of superstructure 21, the shorter moment arm established by first roller 53 is effective to cause a greater rate of pivot of jack 13 during said first part of the movement of superstructure 21 than during said second part of the movement of the superstructure. Thus, the first movement of the superstructure results in a quick flip-up of jack 13, and it is very important and desirable that this quick movement be during the initial part of the movement of the superstructure. From a careful consideration of this, it can be seen that such a result cannot be achieved by a single roller, but can only be achieved with the important concept of the present invention of having a shifting of the moment arms of two different lengths. Continued upward movement of superstructure 21 from the position shown in FIG. 7 will not affect the position of jack 13 and it will remain in the upright position for subsequent contact with the vehicle, not shown, for the lifting thereof. It will be understood that upon subsequent lowering of superstructure 21 towards the ground G, substantially the reverse of the heretofore described operation of jack 13 will take place so that the jack will again be in the downward position when the superstructure is in the lowered position.

From the foregoing description it will be apparent that a unique and improved flip-up jack is provided which is highly efficient and which solves the problems heretofore outlined relative to small foreign cars.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a vehicle lift having a superstructure movable from a lowered position adjacent the ground to raised positions, a flip-up jack comprising pivot means pivotally mounting said jack on said superstructure for pivot of said jack between a downward position and an upright position, a pair of roller means rotatably mounted on said jack for successively engaging the ground during both raising and lowering of said superstructure, said pair of roller means being responsive to movement of said superstructure relative to the ground to cause said jack to pivot between said downward and upright positions.

2. The device of claim 1 in which one of said roller means is at a greater distance from said pivot means than the other of said roller means.

3. In a vehicle lift having a superstructure movable from a lowered position adjacent the ground to raised positions, a quick-acting flip-up jack comprising a vehicle engaging arm, pivot means pivotally mounting said jack on said superstructure for pivot of said jack between a downward position in which said arm is adjacent said superstructure through an intermediate position to an upright position in which said arm extends upwardly from said superstructure, first means connected to said arm and contacting the ground when said superstructure is raised during a first part of its movement from said lowered position to a first given position a short distance above the ground, second means connected to said arm and contacting the ground when said superstructure is raised during a second part of its movement from said first given position to a second given position above the ground, said first means being responsive to movement of said superstructure from said lowered position to said first given position to cause said jack to pivot from said downward position to said intermediate position, said second means being responsive to movement of said superstructure from said first given position to said second given position to cause said jack to pivot from said intermediate position to said upright position, the rate of pivot of said jack being greater during said first part of the movement of said superstructure than during said second part of the movement of said superstructure.

4. In a vehicle lift having a superstructure movable from a lowered position adjacent the ground to raised positions, a quick-acting flip-up jack comprising a vehicle engaging arm, pivot means pivotally mounting said jack on said superstructure for pivot of said jack between a downward position in which said arm is adjacent said superstructure through an intermediate position to an upright position in which said arm extends upwardly from said superstructure, said jack being so arranged that the center of gravity thereof is in such a position that said jack when unrestrained is urged by gravity from said downward position towards said upright position, means for stopping said jack in said upright position, first means connected to said arm and contacting the ground for movably restraining said jack when said superstructure is raised during a first part of its movement from said lowered position to a first given position a short distance above the ground, second means connected to said arm and contacting the ground for movably restraining said jack when said superstructure is raised during a second part of its movement from said first given position to a second given position above the ground, said first means having a first moment arm and being responsive to movement of said superstructure from said lowered position to said first given position to cause said jack to move from said downward position to said intermediate position, said second means having a second moment arm longer than said first moment arm and being responsive to movement of said superstructure from said first given position to said second given position to cause said jack to move from said intermediate position to said upright position, the distance that said superstructure travels during said second part of its movement being greater than the distance that said superstructure travels during said first part of its movement and the angular movement of said jack during said first and second parts of the movement of said superstructure being substantially equal whereby the ratio of the jack angular movement to the superstructure movement is greater during said first part of the movement of said superstructure than during said second part.

5. In a vehicle lift having a superstructure movable from a lowered position adjacent the ground to raised positions, a quick-acting flip-up jack comprising a vehicle engaging arm, pivot means pivotally mounting said jack on said superstructure for pivot of said jack between a downward position in which said arm is adjacent said superstructure through an intermediate position to an upright position in which said arm extends upwardly from said superstructure, an extension of said arm extending past said pivot means, a first roller rotatably mounted on said extension for rotation about a first horizontal axis, a second roller rotatably mounted on said extension for rotation about a second horizontal axis, the distance between said first axis and said pivot means being shorter than the distance between said second axis and said pivot means whereby a shorter moment arm is provided by said first roller than said second roller, said jack being so arranged that the center of gravity thereof is in such a position that said jack when unrestrained is urged by gravity from said downward position towards said upright position, stop means on said jack for stopping said jack in said upright position, when said superstructure is in said lowered position said jack being held in said downward position by said first roller contacting the ground, when said superstructure is raised during a first part of its movement from said lowered position to a first given position above the ground said jack being pivoted under the influence of gravity from said downward position to said intermediate position in which both of said rollers are contacting the ground, when said superstructure is further raised during a second part of its movement from said first given position to a second given position above the ground said jack being pivoted from said intermediate position to said upright position, when said jack is pivoted from said downward position to said intermediate position as heretofore described only said first roller contacting the ground and movably restraining pivot of said jack, and when said jack is pivoted from said intermediate position to said upright position only said second roller contacting the ground and movably restraining pivot of said jack, whereby with a given rate of rise of said superstructure said shorter moment arm established by said first roller is effective to cause a greater rate of pivot of said jack during said first part of the movement of said superstructure than the rate of pivot of said jack during said second part of the movement of said superstructure.

6. The structure according to claim 5 wherein when said jack is in said upright position said first roller is offset to one side of said pivot means and said second roller is offset to the other side of said pivot means, and wherein when said jack is in said intermediate position both of said rollers are offset to the same side of said pivot means.

7. The device of claim 5 including counterweight means attached to said extension.

References Cited in the file of this patent

UNITED STATES PATENTS

| | | |
|---|---|---|
| 1,818,016 | Steedman | Aug. 11, 1931 |
| 1,955,586 | Hott et al. | Apr. 17, 1934 |
| 2,569,982 | Estel | Oct. 2, 1951 |
| 3,004,630 | Clarke | Oct. 17, 1961 |
| 3,048,238 | Wallace | Aug. 7, 1962 |

FOREIGN PATENTS

| | | |
|---|---|---|
| 338,459 | Great Britain | Nov. 20, 1930 |